(12) United States Patent
Mantius et al.

(10) Patent No.: US 9,738,732 B2
(45) Date of Patent: *Aug. 22, 2017

(54) XYLOGLUCAN EXTRACTION PROCESS

(71) Applicant: Ocean Spray Cranberries, Inc., Lakeville-Middleboro, MA (US)

(72) Inventors: Harold L. Mantius, Lakeville-Middleboro, MA (US); Martin Foster Berry, Lakeville-Middleboro, MA (US)

(73) Assignee: Ocean Spray Cranberries, Inc., Lakeville-Middleboro, MA (US)

( * ) Notice: Subject to any disclaimer, the term of this patent is extended or adjusted under 35 U.S.C. 154(b) by 20 days.

This patent is subject to a terminal disclaimer.

(21) Appl. No.: 14/795,695

(22) Filed: Jul. 9, 2015

(65) Prior Publication Data

US 2015/0307635 A1    Oct. 29, 2015

Related U.S. Application Data

(63) Continuation of application No. 13/649,588, filed on Oct. 11, 2012, now Pat. No. 9,107,447.

(60) Provisional application No. 61/546,258, filed on Oct. 12, 2011.

(51) Int. Cl.
| | |
|---|---|
| C08B 37/00 | (2006.01) |
| A23L 1/30 | (2006.01) |
| B01D 15/08 | (2006.01) |
| A23L 2/02 | (2006.01) |
| A23L 2/52 | (2006.01) |
| A23L 29/275 | (2016.01) |
| A23L 19/00 | (2016.01) |
| A23L 33/105 | (2016.01) |

(52) U.S. Cl.
CPC ............ *C08B 37/0057* (2013.01); *A23L 2/02* (2013.01); *A23L 2/52* (2013.01); *A23L 19/00* (2016.08); *A23L 29/275* (2016.08); *A23L 33/105* (2016.08); *B01D 15/08* (2013.01); *A23V 2002/00* (2013.01)

(58) Field of Classification Search
CPC ............................ C08B 37/0057; B01D 15/08
USPC ........................................................ 426/615
See application file for complete search history.

(56) References Cited

U.S. PATENT DOCUMENTS

| | | |
|---|---|---|
| 4,363,264 A | 12/1982 | Lang et al. |
| 4,497,838 A | 2/1985 | Bonnell |
| 4,775,477 A | 10/1988 | Stahl et al. |
| 5,320,861 A | 6/1994 | Mantius et al. |
| 5,419,251 A | 5/1995 | Mantius et al. |
| 5,476,550 A | 12/1995 | Walker |
| 5,646,178 A | 7/1997 | Walker et al. |
| 5,747,088 A | 5/1998 | Fletcher |

(Continued)

FOREIGN PATENT DOCUMENTS

| | | |
|---|---|---|
| CL | 40557 | 4/2000 |
| CL | 1424-2002 | 6/2002 |

OTHER PUBLICATIONS

"NPL Countercurrent apparatus" retrieved from Handbook of food engineering practice / ed by Enrique Rotstein et al., in Chapter 7, pp. 265-267 (1997).

(Continued)

*Primary Examiner* — Hamid R Badr
(74) *Attorney, Agent, or Firm* — Fish & Richardson P.C.

(57) ABSTRACT

The specification provides methods for extracting xyloglucans from fruit, especially from firm fruit such as cranberries, through a sequential extraction procedure.

60 Claims, 2 Drawing Sheets

(56) References Cited

U.S. PATENT DOCUMENTS

| | | | |
|---|---|---|---|
| 6,030,648 | A | 2/2000 | Heldt-Hansen et al. |
| 6,440,483 | B1 | 8/2002 | Ghaedian et al. |
| 7,022,368 | B2 | 4/2006 | Mantius et al. |
| 2005/0186324 | A1 | 8/2005 | Ghaedian et al. |
| 2008/0193629 | A1 | 8/2008 | Pons-Andreau et al. |
| 2009/0035432 | A1 | 2/2009 | Mantius et al. |
| 2012/0070538 | A1 | 3/2012 | Mantius |
| 2012/0135109 | A1 | 5/2012 | Paeschke et al. |

OTHER PUBLICATIONS

Aaron, "Composition of Flavonoid Phenolic Polymers Isolated from Red Wine During Maceration and Significance of Flavan-3-ols in Foods Pertaining to Biological Activity," Thesis submitted to Oregon State University, Mar. 12, 2007; 187 pages.

International Search Report and Written Opinion; Application No. PCT/US/12/59688; dated Jan. 23, 2013; Applicant: Ocean Spray Cranberries, Inc.; 7 pages.

International Search Report and Written Opinion; Application No. PCT/US2010/49158; dated Nov. 3, 2010, Applicant: Ocean Spray Cranberries, Inc.; 9 pages.

Office Action issued in U.S. Appl. No. 12/883,961 dated Jun. 4, 2014 (13 pages).

Office Action issued in U.S. Appl. No. 12/883,961 dated May 13, 2013 (19 pages).

Office Action issued in U.S. Appl. No. 12/883,961 dated Oct. 10, 2012 (20 pages).

Office Action issued in U.S. Appl. No. 12/883,961 dated Jan. 12, 2015 (15 pages).

Response to Office Action issued in U.S. Appl. No. 12/883,961 dated Jan. 12, 2015, filed May 7, 2015 (10 pages).

Response to Office Action issued in U.S. Appl. No. 12/883,961 dated May 13, 2013 filed Aug. 13, 2013 (12 pages).

Response to Office Action issued in U.S. Appl. No. 12/883,961 dated Oct. 10, 2012 filed Jan. 10, 2013 (12 pages).

Response to Office Action issued in U.S. Appl. No. 12/883,961 dated Jun. 4, 2014; filed Sep. 25, 2014 (13 pages).

White et al., J. Agric. Food Chem., 58:4030-4036 (2010).

Zhang, J., Enzymes in Fruit Juice Extraction (2009).

XYLOGLUCAN EXTRACTION PROCESS

CROSS-REFERENCE TO RELATED APPLICATIONS

This application is a continuation of U.S. patent application Ser. No. 13/649,588, filed Oct. 11, 2012, now U.S. Pat. No. 9,107,447, which claims the benefit of U.S. Provisional Application No. 61/546,258, filed on Oct. 12, 2011, which are incorporated by reference herein in their entireties.

TECHNICAL FIELD

The claimed methods relate to the extraction of xyloglucan from fruit, especially cranberries.

BACKGROUND

Xyloglucans are 1,4-β-glucans that are substituted with α-1,6-xylosyl side chains. They are typically found in large amounts in the primary cell walls of dicots. Primary cell wall xyloglucans are tightly hydrogen bonded to cellulose microfibrils and are thought to form the major load-bearing/elastic network of the wall. Xyloglucans are useful in a number of applications, including use as biodegradable films and in human and animal nutrition. The selective capture and dry weight concentration of xyloglucans from fruit, such as cranberries, may open up novel opportunities in the field of product application (e.g., retail beverages, lozenges) relative to delivering those unique benefits.

SUMMARY

Extraction processes for isolating xyloglucans from fruit are described. In one aspect, the specification provides a method for extracting xyloglucans from fruit, comprising: treating the fruit in a first extraction by advancing the fruit along a path while flowing a first extraction liquid countercurrently to the advancing fruit, wherein the first extraction is performed at a temperature of about 75° F. or less, to thereby provide a juice extract and a once-extracted fruit; treating the once-extracted fruit in a second extraction by advancing the fruit along a path while flowing a second extraction liquid countercurrently to the advancing fruit, wherein the fruit is contacted with pectinase enzymes under conditions sufficient to digest at least a portion of the pectin in the fruit, and wherein the second extraction is performed at a temperature of at least about 90° F., to thereby provide a xyloglucan and proanthocyanidin-containing extract and a twice-extracted fruit; treating the xyloglucan and proanthocyanidin-containing extract to remove at least a portion of the proanthocyanidins from the extract, to thereby provide a xyloglucan-enriched extract; and collecting the xyloglucan-enriched extract.

In another aspect, the specification provides a method for extracting xyloglucans from fruit, comprising: treating the fruit in a first extraction by advancing the fruit along a path while flowing a first extraction liquid countercurrently to the advancing fruit, wherein the first extraction is performed at a temperature of about 75° F. or less, to thereby provide a juice extract and a once-extracted fruit; treating the once-extracted fruit in a second extraction by advancing the fruit along a path while flowing a second extraction liquid countercurrently to the advancing fruit, wherein the second extraction is performed at a temperature of at least about 130° F. and under conditions sufficient to solubilize a substantial portion of the pectin in the fruit, to thereby provide a xyloglucan and proanthocyanidin-containing extract and a twice-extracted fruit; treating the xyloglucan and proanthocyanidin-containing extract to remove at least a portion of the proanthocyanidins from the extract, to thereby provide a xyloglucan-enriched extract; and collecting the xyloglucan-enriched extract.

In still another aspect, the specification provides a method for extracting xyloglucans from fruit, comprising: treating the fruit in a first extraction by advancing the fruit along a path while flowing a first extraction liquid countercurrently to the advancing fruit, wherein the first extraction is performed at a temperature of about 75° F. or less, to thereby provide a juice extract and a once-extracted fruit; treating the once-extracted fruit in a second extraction by advancing the fruit along a path while flowing a second extraction liquid countercurrently to the advancing fruit, wherein the second extraction is performed at a temperature of at least about 90° F. to about 129° F., to thereby provide a proanthocyanidin-containing extract and a twice-extracted fruit; treating the twice-extracted fruit in a xyloglucan extraction by advancing the fruit along a path while flowing a third extraction liquid countercurrently to the advancing fruit, wherein the fruit is contacted with pectinase enzymes under conditions sufficient to digest at least a portion of the pectin in the fruit, to thereby provide a xyloglucan-containing extract and a thrice-extracted fruit; and collecting the xyloglucan-containing extract.

In yet another aspect, the specification provides a method for extracting xyloglucans from fruit, comprising: treating the fruit in a first extraction by advancing the fruit along a path while flowing a first extraction liquid countercurrently to the advancing fruit, wherein the first extraction is performed at a temperature of about 75° F. or less, to thereby provide a juice extract and a once-extracted fruit; treating the once-extracted fruit in a second extraction by advancing the fruit along a path while flowing a second extraction liquid countercurrently to the advancing fruit, wherein the second extraction is performed at a temperature of at least about 90° F. to about 129° F., to thereby provide a proanthocyanidin-containing extract and a twice-extracted fruit; treating the twice-extracted fruit in a xyloglucan extraction by advancing the fruit along a path while flowing a third extraction liquid countercurrently to the advancing fruit, wherein the fruit is heated to at least about 130° F. and under conditions sufficient to solubilize a substantial portion of the pectin in the fruit, to thereby provide a xyloglucan-containing extract and a thrice-extracted fruit; and collecting the xyloglucan-containing extract.

In one aspect, the specification describes a method for extracting xyloglucans from fruit, comprising: treating the fruit in a first extraction in a tank by bathing the fruit in a first extraction liquid, wherein the first extraction is performed at a temperature of about 75° F. or less; collecting the first extraction liquid to thereby provide a juice extract and a once-extracted fruit; treating the once-extracted fruit in a second extraction in a tank by bathing the fruit in a second extraction liquid, wherein the fruit is contacted with pectinase enzymes under conditions sufficient to digest at least a portion of the pectin in the fruit, and wherein the second extraction is performed at a temperature of at least about 90° F.; collecting the second extraction liquid to thereby provide a xyloglucan and proanthocyanidin-containing extract and a twice-extracted fruit; treating the xyloglucan and proanthocyanidin-containing extract to remove at least a portion of the proanthocyanidins from the extract, to thereby provide a xyloglucan-enriched extract; and collecting the xyloglucan-enriched extract.

In another aspect, the specification describes a method for extracting xyloglucans from fruit, comprising: treating the fruit in a first extraction in a tank by bathing the fruit in a first extraction liquid, wherein the first extraction is performed at a temperature of about 75° F. or less; collecting the first extraction liquid to thereby provide a juice extract and a once-extracted fruit; treating the once-extracted fruit in a second extraction in a tank by bathing the fruit in a second extraction liquid, wherein the second extraction is performed at a temperature of at least about 130° F. and under conditions sufficient to solubilize a substantial portion of the pectin in the fruit; collecting the second extraction liquid to thereby provide a xyloglucan and proanthocyanidin-containing extract and a twice-extracted fruit; treating the xyloglucan and proanthocyanidin-containing extract to remove at least a portion of the proanthocyanidins from the extract, to thereby provide a xyloglucan-enriched extract; and collecting the xyloglucan-enriched extract.

In still another aspect, the specification describes a method for extracting xyloglucans from fruit, comprising: treating the fruit in a first extraction in a tank by bathing the fruit in a first extraction liquid, wherein the first extraction is performed at a temperature of about 75° F. or less; collecting the first extraction liquid to thereby provide a juice extract and a once-extracted fruit; treating the once-extracted fruit in a second extraction in a tank by bathing the fruit in a second extraction liquid, wherein the second extraction is performed at a temperature of at least about 90° F. to about 129° F.; collecting the second extraction liquid to thereby provide a proanthocyanidin-containing extract and a twice-extracted fruit; treating the twice-extracted fruit in a xyloglucan extraction in a tank by bathing the fruit in a third extraction liquid, wherein the fruit is contacted with pectinase enzymes under conditions sufficient to digest at least a portion of the pectin in the fruit; and collecting the third extraction liquid to thereby provide a xyloglucan-containing extract and a thrice-extracted fruit.

In yet another aspect, the specification describes a method for extracting xyloglucans from fruit, comprising: treating the fruit in a first extraction in a tank by bathing the fruit in a first extraction liquid, wherein the first extraction is performed at a temperature of about 75° F. or less; collecting the first extraction liquid to thereby provide a juice extract and a once-extracted fruit; treating the once-extracted fruit in a second extraction in a tank by bathing the fruit in a second extraction liquid, wherein the second extraction is performed at a temperature of at least about 90° F. to about 129° F.; collecting the second extraction liquid to thereby provide a proanthocyanidin-containing extract and a twice-extracted fruit; treating the twice-extracted fruit in a xyloglucan extraction in a tank by bathing the fruit in a third extraction liquid, wherein the extraction is performed at a temperature of at least about 130° F. and under conditions sufficient to solubilize a substantial portion of the pectin in the fruit, to thereby provide a xyloglucan-containing extract and a thrice-extracted fruit; and collecting the xyloglucan-containing extract.

In some instances, a first extraction, a second extraction, or both, can be performed in a countercurrent apparatus. In other instances, a first extraction, a second extraction, a third extraction, or all three extractions, can be performed in a countercurrent apparatus.

In some instances, a first extraction can be performed at a temperature of less than 70° F. In other instances, a second extraction can be performed in a countercurrent apparatus, wherein the residence time of the once-extracted fruit during the second extraction in the countercurrent apparatus is greater than about 30 minutes.

In some instances, a second extraction extracts at least 10% of the soluble solids that were present in the once-extracted fruit.

In some instances, a first extraction liquid is substantially free of pectinase enzymes.

In some instances, treating a xyloglucan and proanthocyanidin-containing extract includes filtering the extract. In other instances, treating a xyloglucan and proanthocyanidin-containing extract includes using column chromatography to remove proanthocyanidins from the extract.

In some instances, a xyloglucan-containing extract is treated to remove proanthocyanidins. For example, proanthocyanidins can be removed using column chromatography.

In some instances, xyloglucan-containing or xyloglucan-enriched extracts can be concentrated to thereby form a concentrated extract. The concentrated extract can be, e.g., a powdered extract.

In some instances, the fruit can be cranberry, blueberry, grape, cherry, blackberry, raspberry, and/or apple, or any mixture thereof.

"Firm fruit" is fruit that resists structural collapse under substantial compression. Examples include cranberries, apples, cherries, and grapes. On the other hand, "soft fruits" are more readily collapsed. Examples include blueberries, raspberries, blackberries, and the meat of various fruits especially tropical fruits, e.g., kiwi, guava, mango, and passion. "Once-extracted fruit" is whole fruit or fruit piece(s) that have been subjected to one extraction step such that at least or about 85%, e.g., at least or about 90%, 91%, 92%, 93%, 94%, 95%, 96%, 97%, 98%, or at least or about 99%, of the inherent soluble solids have been removed. "Twice-extracted fruit" is whole fruit or fruit piece(s) that have been subjected to two extraction steps, such that at least or about 10%, e.g., at least or about 20%, 30%, 40%, 50%, 60%, 70%, 80%, 90%, 95%, 96%, 97%, 98%, or at least or about 99%, of the residual soluble solids that were present in the once-extracted fruit feedstock have been removed. "Thrice-extracted fruit" is whole fruit or fruit piece(s) that have been subjected to three extraction steps, the last of which includes treatment with pectinase enzymes and/or high temperature under conditions that allow at least about 5%, e.g., at least about 10%, 20%, 30%, 40%, 50%, 60%, 70%, 80%, 90%, 95%, 96%, 97%, 98%, or at least or about 99% of the pectin that was present in the twice-extracted fruit to be digested and/or solubilized. It will be understood that the processes of the claimed methods may achieve advantages such as improved yield, quality, and lower cost with many fruits. All percentages herein are by weight unless otherwise indicated or apparent.

Unless otherwise defined, all technical terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, and other references mentioned herein are incorporated by reference in their entirety. In case of conflict, the present specification, including definitions, will control.

Other features and advantages of the invention will be apparent from the following detailed description and figure, and from the claims.

DETAILED DESCRIPTION

Figure 1:
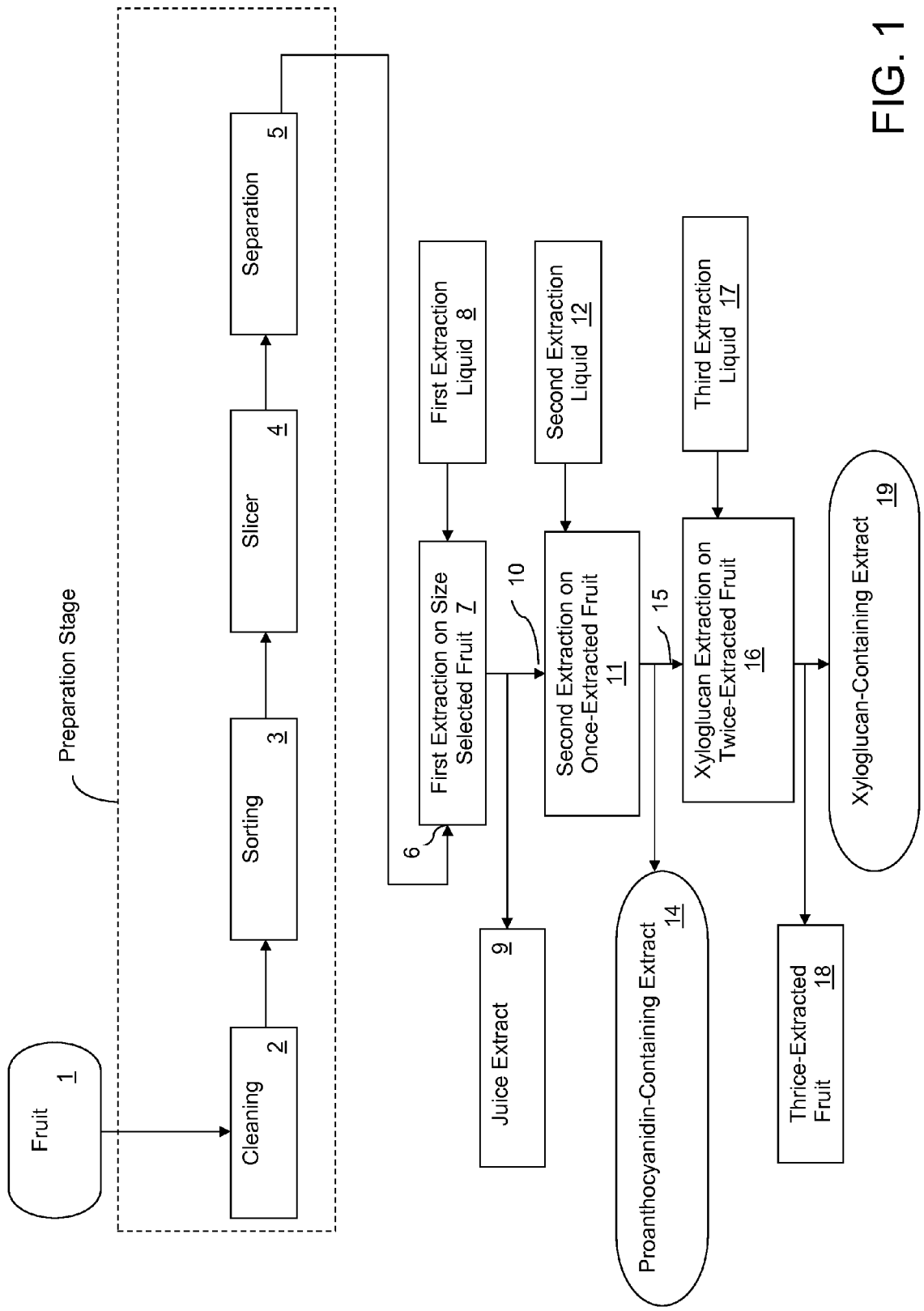
FIG. 1 depicts a flow diagram illustrating a three-stage extraction procedure to extract xyloglucans from fruit.
Figure 2:
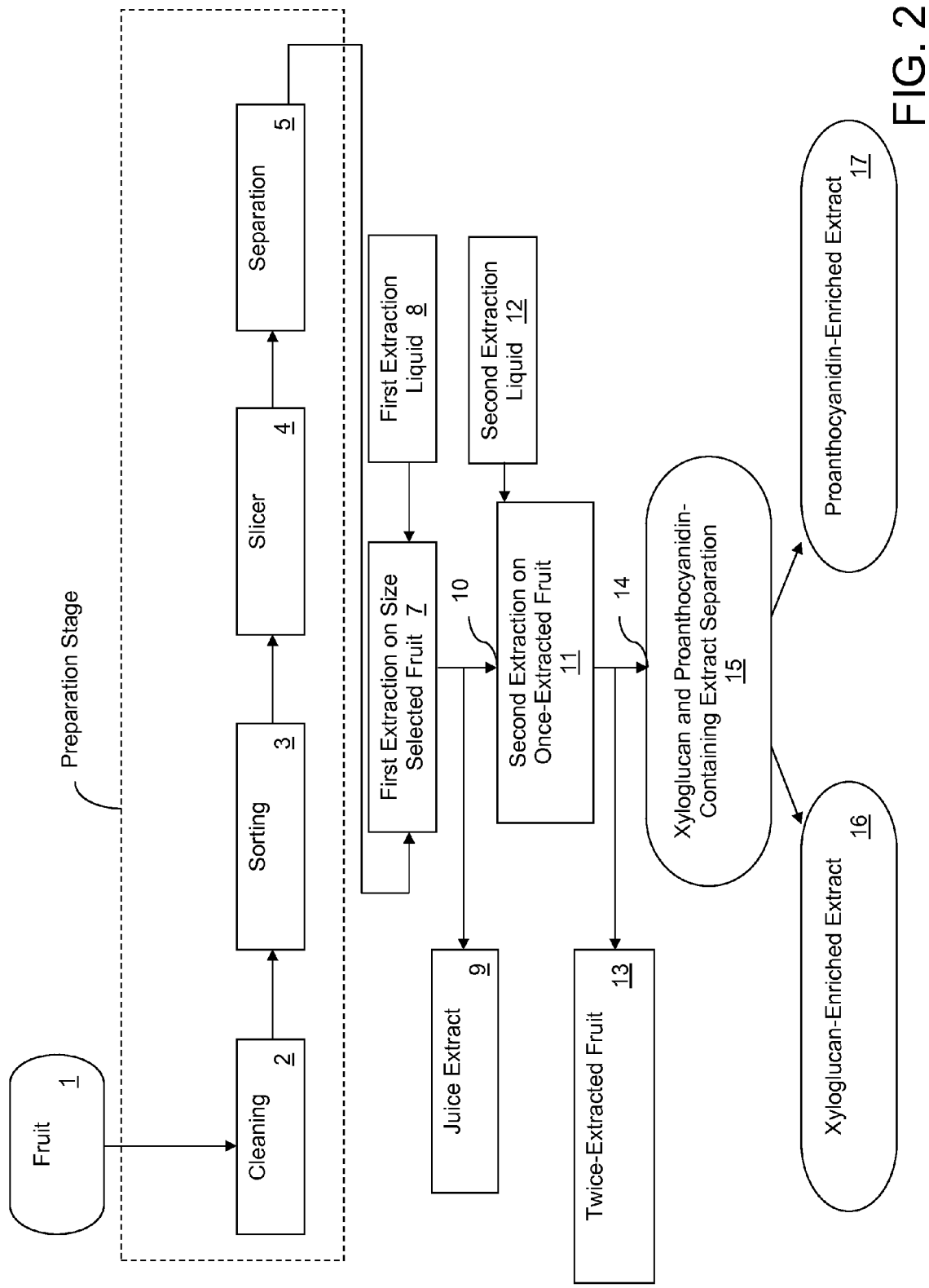
FIG. 2 depicts a flow diagram illustrating a two-stage extraction procedure to extract xyloglucans from fruit.

Flow diagrams are shown in FIG. 1 and FIG. 2 of exemplary extraction processes to extract xyloglucans from fruit. A commercially available countercurrent apparatus can be used in the process, e.g., as described in U.S. Pat. No. 5,320,861. However, it will be understood by skilled practitioners that other types of extractors may be used in the process. The process will be described for use with cranberries, although it may be adapted for use with other fruit, such as blueberries.

Countercurrent Apparatus

An exemplary countercurrent apparatus useful as an extractor includes an elongate trough-shaped housing inclined at an angle, e.g., about 2 to 6 degrees, with a helical screw conveyor intermittently rotated by a motor means, connected to a shaft on its longitudinal axis. The housing has an inlet disposed above the lower end of the screw for the introduction of the fruit to be extracted, e.g., raw cranberries, and an outlet at the higher end for the removal of extracted fruit. A charging line is provided for charging extraction liquid into the housing and a discharge line is provided for the discharge of liquid extract (e.g., a mixture of extraction liquid and soluble fruit solids). The trough temperature may be controlled using any means known to skilled practitioners, e.g., by heating with a circulating water jacket positioned about the trough. Alternatively or in addition, one may control temperature by controlling the temperature of the fruit and/or extraction liquid prior to introduction to the extractor. The screw conveyor is operated by intermittently reversing the direction of rotation of the screw. The reversal helps the relatively compacted mass of matter being extracted to be opened up enhancing the penetration of extracting liquid. Other details of a suitable countercurrent extractor and methods are described in U.S. Pat. No. 4,363,264, the entire contents of which are hereby incorporated by reference. Commercially available fruit extractor units (e.g., CCE Model 1200, Millerbernd Systems, Winsted, Minn.) may be modified and operated with beneficial results as described further below.

First Extraction

The first extraction is performed at a relatively low temperature. For example, the first extraction can be performed at a temperature of less than or about 75° F., e.g., less than or about 70° F., 65° F., 60° F., 55° F., 50° F., 45° F., 40° F., 35° F., 34° F., e.g., less than or about 33° F., but at a temperature above the point at which the extraction liquid completely freezes, or at a temperature in a range between any two of the above-referenced values. For example, the first extraction can be performed in a range of about 75° F. to about 33° F., about 70° F. to about 35° F., about 65° F. to about 40° F. or about 60° F. to about 45° F. Skilled practitioners will appreciate that any art-known method and/or apparatus can be used to perform an extraction of juice in accordance with the present invention. For example, countercurrent extraction and/or a tank system (e.g., as described in U.S. Pat. No. 6,440,483, which is incorporated by reference) can be employed in the first extraction. In an exemplary first extraction, whole raw fruit (FIG. 1, 1), which has been bulk frozen, is provided to a cleaning stage 2 to remove loose debris such as twigs, stems, leaves, soil, etc., and then conveyed to a sorting stage 3, which sorts fruit to a selected size (e.g., a minimum size specification) and removes undesirable foreign material (e.g., wood fragments and metal clips). The size-selected fruit is next passed to a slicer stage 4 (e.g., Model CC, Urschel Laboratories, Inc., Valparaiso, Ind.), which slices the berries to expose the inner pulp of the fruit unprotected by the skin, although other skin penetrating treatments such as scarifying may also be used.

The sliced fruit (e.g., at about 15° F.) can be transported, for example by means of a flume, to a separation stage 5, which can include a vibratory shaker with perforated plates, to separate the sliced fruit from the flume fluid (e.g., water; initially at about 115° F.). The thawed sliced fruit (e.g., at about 65° F.) is then provided as solid input 6 to a first extraction stage 7, which in this example employs a countercurrent apparatus (e.g., as described in U.S. Pat. Nos. 5,320,861 and 5,419,251, hereby incorporated by reference, and as described briefly above). However, it will be understood by skilled practitioners that any means of extracting juice, e.g., using other extractors known in the art, may be used in the process. Moreover, freezing of the fruit prior to processing can also be useful in that, upon rethawing, the fruit is structurally more susceptible to juice extraction. The liquid input 8 to the first extraction stage can be any suitable liquid for extracting juice, e.g., an aqueous extraction liquid (e.g., reverse osmosis permeate water without any added enzyme). The liquid output 9 of the first extraction stage is an extract mixture of extraction liquid and fruit juice. The first extraction, as discussed above, is performed at low temperature (e.g., less than 75° F.), and optionally, e.g., at a relatively high efficiency (e.g., effecting the removal of greater than 90% of the sugars and acids present in the fruit feedstock), which can avoid the detrimental effects on juice quality often associated with higher temperature extraction, such as reduced shelf-life characteristics and off notes in juice flavor stemming from elevated tannin levels. Moreover, a low temperature extraction (e.g., less than about 75° F.) preferentially removes the sugars and acids present in the fruit feedstock, leaving behind in the resultant extracted fruit a relatively higher proportion of the feedstock's inherent phytochemical content (e.g., anthocyanins and proanthocyanidins). The raw juice extract from the extractor stage liquid output 9 can be further treated, e.g., as described in U.S. Pat. No. 5,320,861. Briefly, liquid output 9 can be treated, first in a separation stage to remove and collect extraneous seeds and pulp solids at a collection stage. The juice extract can also be further treated in a depectinization stage in which pectinase enzyme is provided and mixed with the juice extract. The enzyme, e.g., in amounts between about 0.01 and 0.1 percent, clears the juice extract of pectin in preparation for a filtration stage. Filtration can be achieved by means of a microfilter of, e.g., 0.1-0.5 micron pore size. The filtered juice extract can be further treated at a reverse osmosis stage where the juice extract is passed through a membrane system under pressure to semi-concentrate the juice product to about 18° Brix. This semi-concentrated juice product can then be concentrated to a higher level (e.g., about 50° Brix) through evaporative concentration as the final juice product. The cranberry juices produced by the process can have a tannin content of less than about 1900 mg/L, e.g., about 1700 mg/L (measured at 7.5° Brix).

Second Extraction

The first extraction stage 7 is followed by a second extraction stage 11 operated at a higher temperature than that of the first extraction stage (e.g., greater than or about 90° F., e.g., greater than or about 95° F., 100° F., 110° F., 112° F., 115° F., 120° F., 128° F., 130° F., 135° F., 140° F., 142° F., 143° F., 145° F., or greater than or about 150° F., 160° F., 170° F., or 180° F., or at a temperature in a range between any two of these values). For example, depending upon the desired outcome of the process, the second extraction can be performed in a range of temperatures of about 90° F. to about 190° F., e.g., about 100° F. to about 150° F., about 110° F. to about 145° F., or about 125° F. to about 145° F. Other exemplary ranges include about 138° F. to about 142° F., about 112° F. to about 118° F., about 130° F. to about 145° F., about 150° F. to about 178° F., about 178° F. to about 190° F. and about 130° F. to about 190° F. In other embodiments, the second extraction can be performed in a range of temperatures of about 90° F. to about 212° F., e.g., about 100° F. to about 212° F., about 110° F. to about 212° F., about 120° F. to about 212° F., about 130° F. to about 212° F., about 140° F. to about 212° F., about 150° F. to about 212° F., about 160° F. to about 212° F., about 170° F. to about 212° F., about 180° F. to about 212° F., about 190° F. to about 212° F., about 200° F. to about 212° F., or about 205° F. to about 210° F. Skilled practitioners will appreciate that any art-known method and/or apparatus can be used to perform this second extraction in accordance with the present invention. For example, countercurrent extraction and/or a tank system (e.g., as described in U.S. Pat. No. 6,440,483, which is incorporated by reference) can be employed. In an exemplary second extraction stage, the once-extracted fruit from stage 7 is provided as solid input 10 to a second extraction stage 11, which in this example employs a countercurrent apparatus, e.g., an extractor as described above and in U.S. Pat. Nos. 5,320,861 and 5,419,251. The extractor used in the second extraction may be, e.g., the same extractor used in the first extraction or a second, different extractor. When a different extractor is used for the second extraction, the once-extracted fruit may be moved by any means known in the art, e.g., via a vibratory conveyor, from the first extractor to the second extractor. The extraction temperature may be controlled using any means known to those of skill in the art, e.g., by regulating the trough temperature (e.g., by heating with a circulating water jacket positioned about the trough). Alternatively or in addition, one may control temperature by controlling the temperature of the fruit and/or extraction liquid prior to introduction to the extractor.

The liquid input 12 to the extractor can be any liquid suitable for extracting proanthocyanidins, e.g., an aqueous extraction liquid, e.g., reverse osmosis permeate water. The residence time of the fruit in the extractor during the second extraction can be, e.g., about 90 to about 150 minutes, e.g., about 100 to about 140 minutes, about 110 to about 130 minutes, or about 120 to about 125 minutes. In some instances, the residence time can be at least or about 30 minutes, e.g., at least or about 60 minutes. Further, skilled practitioners will appreciate that the residence time of the fruit in the extractor can be adjusted upwardly or downwardly (e.g., to less than 60 minutes, e.g., about 10 minutes to about 60 minutes) based on the desired outcome and any number of factors and conditions. The remaining solid product of the second extraction stage 11 is a twice-extracted fruit 15. The liquid output of the extraction stage 11 is a proanthocyanidin-containing extract 14.

Twice-extracted fruit is typically characterized by the removal of at least or about 10%, e.g., at least or about 20%, 30%, 40%, 50%, 60%, 70%, 80%, 90%, 95%, 96%, 97%, 98%, or at least or about 99%, of the residual soluble solids that were present in the once-extracted fruit feedstock.

Extraction of Xyloglucans

Xyloglucans can be extracted from the fruit at one or more points in the process described above and using a number of methods. For example, xyloglucans can be extracted by treating once- or twice-extracted fruit with pectinase. The pectinases are an art-known family of enzymes that break down pectin. Pectinases that can be used in the present methods are well-known in the art and can be obtained from any source. Some pectinases useful in the present invention are commercially available from, e.g., DSM Food Specialties USA, Inc., and Novozymes Switzerland AG.

Alternatively or in addition, xyloglucans can be extracted from once- or twice-extracted fruit using high temperatures. Treating fruit with heat, e.g., temperatures of about 130° F. and above, will solubilize a portion, e.g., a substantial portion, e.g., at least 10%, 20%, 30%, 40%, 50%, 60%, 70%, 80%, 90%, 95%, 99%, or 100%, of the pectin in the fruit, thereby releasing the xyloglucan, e.g., into an extraction liquid.

Skilled practitioners will appreciate that any art-known method and/or apparatus can be used to perform the xyloglucan extraction in accordance with the present invention. For example, countercurrent extraction and/or a tank system (e.g., as described in U.S. Pat. No. 6,440,483, which is incorporated by reference) can be employed. Referring to FIG. 1, in an exemplary embodiment, the twice-extracted fruit from the second extraction stage 11 is provided as solid input 15 to a xyloglucan extraction stage 16, which in this example employs a countercurrent apparatus, e.g., an extractor as described above and in U.S. Pat. Nos. 5,320,861 and 5,419,251. The extractor used in the xyloglucan extraction may be, e.g., the same extractor used in the first and/or second extraction or it may be a different extractor. When a different extractor is used for the xyloglucan extraction, the twice-extracted fruit may be moved by any means known in the art, e.g., via a vibratory conveyor from one extractor to the other. The extraction temperature may be controlled using any means known to those of skill in the art, e.g., by regulating the trough temperature (e.g., by heating with a circulating water jacket positioned about the trough). Alternatively or in addition, one may control temperature by controlling the temperature of the twice-extracted fruit and/ or extraction liquid prior to introduction to the extractor.

Liquid input 17 to the extractor can be any liquid suitable for extracting xyloglucans e.g., an aqueous extraction liquid, such as reverse osmosis permeate water. The residence time of the twice-extracted fruit in the extractor during the xyloglucan extraction can be, e.g., about 60 to about 120 minutes. Further, skilled practitioners will appreciate that the residence time of the fruit in the extractor can be adjusted upwardly or downwardly (e.g., to 30 minutes) based on the desired outcome and any number of factors and conditions, such as the volume of twice-extracted fruit being treated and the temperature at which the extraction is being performed.

In one embodiment, to perform the extraction, the twice-extracted fruit is contacted with pectinase enzymes. Pectinase enzymes can be added using any method known in the art, such as by directly adding pectinase enzymes to the twice-extracted fruit in the extractor, and/or by adding pectinase enzymes to liquid input 17 and then combining liquid input 17 with the twice-extracted fruit in the extractor. The xyloglucan extraction step can be performed at a temperature in which pectinase enzymes are active, e.g., from about 90° F. to 130° F., e.g., 115° F., or at a temperature in a range between any two of these values. For example, depending upon the desired outcome of the process, the xyloglucan pectinase extraction step can be performed in a range of temperatures of about 100° F. to 120° F.

In another embodiment, alternatively or in addition, the twice-extracted fruit is exposed to high temperatures, e.g., 130° F. to 140° F. During the xyloglucan extraction, xyloglucans are released from the twice-extracted fruit into the aqueous extraction liquid (e.g., reverse osmosis permeate water). The solid product of the xyloglucan extraction stage 16 is a thrice-extracted fruit 18. The liquid output of the extraction stage 16 is a xyloglucan-containing extract 19.

A xyloglucan-containing extract may if desired be further purified of non-xyloglucan elements. For example, phenolics and proanthocyanidins present in the xyloglucan-containing extract may be removed using column chromatography. The xyloglucan-containing extract may be run through a column that binds phenolics and proanthocyanidins, thereby substantially separating xyloglucans from any phenolics and proanthocyanidins that may be present in the extract. Exemplary methods and column resins useful for removing phenolics and proanthocyanidins from a xyloglucan-containing extract in accordance with the present invention are known in the art and are described, for example, in PCT Application Serial No. PCT/US2010/031492 (Publication No. WO 2010/121203). For example, suitable resins include, but are not limited to, resins with one or more of the following physical properties: a surface area of greater than or equal to about 300 $m^2/g$ (e.g., greater than 380 $m^2/g$ or equal to about 700 $m^2/g$), aliphatic ester resins, a moisture holding capacity of about 61% to about 69%, a porosity of greater than about 0.5 ml/ml. Particularly useful resins include Amberlite™ XAD-7HP resin and Amberlite™ FPX-66. Other potentially useful and commercially available resins include, but are not limited to, SP207 Sepabeads™ (Mitsubishi Chemical), SP700 Sepabeads™ (Mitsubishi Chemical), Diaion HP20 (Mitsubishi Chemical), Diaion SP70 (Mitsubishi Chemical), Diaion SP825 (Mitsubishi Chemical), Diaion SP850 (Mitsubishi Chemical), Diaion HP2MG methacrylate (Mitsubishi Chemical), ADS-5 (Nankai University, Tianjin, China), ADS-17 (Nankai University, Tianjin, China), Amberlite™ XAD-4 (manufactured by Organo Co. and distributed globally by Rohm & Hass), Amberlite™ XAD-16 (manufactured by Organo Co. and distributed globally by Rohm & Hass), Amberlite™ XAD-1600 (manufactured by Organo Co. and distributed globally by Rohm & Hass), Amberlite™ XAD-2 (manufactured by Organo Co. and distributed globally by Rohm & Hass), Amberlite™ XAD-1180 (manufactured by Organo Co. and distributed globally by Rohm & Hass), Amberlite™ XAD-2000 (manufactured by Organo Co. and distributed globally by Rohm & Hass), Amberchrom™ CG300-C(Rohm & Hass), and any combination thereof. Other exemplary methods to purify the xyloglucan-containing extract include filtration, as described, for example, in U.S. Publication No. US 2009/0035432. Using said filtration step, the lower molecular weight compounds, e.g., phenolics present in the extract selectively pass through the filter membrane. A xyloglucan-enriched extract is thereby obtained as the resultant retentate.

Other processes for xyloglucan extraction are shown in FIG. 2. Referring to FIG. 2, fruit is prepared and the first extraction is carried out as described above. In this process, the second extraction and xyloglucan extraction are combined into a single second extraction 11. Second extraction 11 is performed on once-extracted fruit, i.e., following the first extraction stage discussed above. In one embodiment, pectinase enzymes are added to the once-extracted fruit before commencement of and/or during the second extraction stage 11. The pectinase enzymes can be added using any method known in the art, such as by directly adding pectinase enzymes to the once-extracted fruit in the extractor, and/or by adding pectinase enzymes to liquid input 12 and then combining liquid input 12 with the once-extracted fruit. In another embodiment, alternatively or in addition, the once-extracted fruit is exposed to high temperatures, e.g., greater than 130° F. In these processes, the second extraction step is performed as described above. During the second extraction, the xyloglucans are released from the once-extracted fruit into the aqueous extraction liquid (e.g., water) along with proanthocyanidins, thereby providing a xyloglucan and proanthocyanidin-containing extract 14. The remaining solid product of the second extraction stage 11 is a twice extracted fruit 13. The liquid output 14 of the second extraction stage 11 is the xyloglucan and proanthocyanidin-containing extract 14.

As a final step of the process, the xyloglucan and proanthocyanidin-containing extract 14 is provided as a liquid input to a separation stage 15, wherein the proanthocyanidins and xyloglucans are substantially separated to yield a xyloglucan-enriched extract 16 and a proanthocyanidin-enriched extract 17. Skilled practitioners will appreciate that this can be accomplished in any number of ways. For example, proanthocyanidins can be removed from the mix using column chromatography, as described above.

Liquid xyloglucan-containing extracts (including relatively pure xyloglucan-containing extracts and extracts that contain both xyloglucans and proanthocyanidins) described herein can be dried to provide a solid extract containing xyloglucans. Methods for drying the liquid extracts can include, but are not limited to, for example, freeze drying, vacuum drying, spray drying, drum drying, shelf drying, and drying by microwave.

Extracts produced by the methods described herein can be used in or as nutriceuticals or as food supplements. For example, the extracts can be formulated as pills, tablets, capsules or syrups for oral administration (e.g., useful as dietary supplements). Alternatively, the extracts can be used to supplement a food or beverage to enhance the health benefits conferred by the food or beverage. For example, such an extract could be applied to (e.g., coated onto or infused into) dried fruits, for example dried cranberries, to create a dried fruit with enhanced health benefits. Alternatively or in addition, extracts can be used to supplement, for example, juices and juice drinks (e.g., cranberry juice cocktails and juice blends), tea (e.g., herbal and non-herbal tea), leaf tea, yogurt, milk, smoothies, chewing gum, dietary supplements, and milk (e.g., liquid and powdered milk).

EXAMPLES

The invention is further described in the following examples, which do not limit the scope of the invention described in the claims.

A two-step extraction procedure to extract proanthocyanidins from cranberries was performed as described above. Bulk-frozen cranberries were subjected to a standard first extraction at low temperature (e.g., less than about 75° F.) to provide a juice extract and once-extracted fruit. Second extractions were performed on the once-extracted fruit to extract proanthocyanidins. Four different sets of second extraction conditions were tested, each set being tested in one second extraction or "run." Each of the four runs differed mainly in extraction temperature and the use of pectinase enzymes. The four runs can be generally described as follows:

A. Extractor Temperature: 115° F.; no enzyme added;
B. Extractor Temperature: 128° F.; no enzyme added;

C. Extractor Temperature: 142-144° F.; no enzyme added; and

D. Extractor Temperature: 113-114° F.; pectinase enzyme added.

As shown in Table 1, a greater yield of proanthocyanidins was obtained with second extractions performed at elevated temperatures. In this regard, 25% of proanthocyanidins were extracted in Run A, which was performed at 115° F. The yield of proanthocyanidins increased to 34% when the extraction was performed at 128° F. (Run B). The yield increased an additional two-fold to 66% when the extraction was performed at 142-144° F. (Run C).

As can been seen in Table 1, Run D, extraction efficiency can also be increased by the addition of pectinase enzymes. These enzymes catalyze the hydrolysis of pectin, a polysaccharide that is found in the cell walls of plants. The conditions of Run D are similar to those of Run A except that in Run D, pectinase enzyme was also added. As a result of the added enzyme, Run D was more than twice as efficient as Run A in extracting proanthocyanidins from once-extracted cranberries.

These examples clearly demonstrate that extraction efficiency is a function of temperature and pectinase enzymes. It will be understood by skilled practitioners that higher proanthocyanidin yields could be obtained by manipulating process conditions, e.g., employing higher extraction temperatures and/or different enzyme systems.

In one exemplary method to extract xyloglucans from the fruit, the twice-extracted fruit of Runs A and/or B are treated in a third extraction stage with pectinase enzymes at about 115° C. for 60 minutes. In this process, the xyloglucans that are retained in the twice-extracted fruit would be subsequently released through enzymatic digestion.

In another exemplary method, the extract obtained from Runs C and/or D is passed through a suitable resin column as described in detail above. This process would substantially separate the xyloglucans from the proanthocyanidins present in those extracts. The xyloglucans would exit the column in the permeate and the proanthocyanidins would be retained in the column bound to the resin.

TABLE 1

Four Separate Extractions Performed on Once-Extracted Cranberries (Hulls)

| Run | A | B | C | D |
|---|---|---|---|---|
| Hull Feedrate (g/min.) | 225 | 225 | 225 | 450 |
| Hull PACs (%, dwb) | 6.76 | 6.03 | 6.25 | 6.66 |
| Hull Solids (%) | 3.88 | 4.91 | 3.66 | 4.14 |
| Extraction Water Feedrate (g/min.) | 900 | 900 | 900 | 450 |
| Extractor Residence Time (min.) | 121 | 121 | 120 | 120 |
| Extractor Temperature (° F.) | 115 | 128 | 142-144 | 113-114 |
| Pectinase Enzyme Usage (g/min.) | 0 | 0 | 0 | 0.1 |
| Extracted Hull Discharge (g/min.) | 204.1 | 226.8 | 159.2 | ND |
| Extracted Hull PACs (%, dwb) | 3.48 | 3.59 | 1.72 | ND |
| Extracted Hull Solids (%) | 5.32 | 5.17 | 5.24 | ND |
| Liquid Extract Discharge (g/min) | 926.5 | 889.3 | 975.1 | 684.4 |
| Liquid Extract PACs (%, dwb) | 22.84 | 25.19 | 10.21 | 6.17 |
| Liquid Extract Soluble Solids (° Brix) | 0.07 | 0.1 | 0.34 | 1.65 |
| Material Balance Error (g/min.) | 5.6 | 8.9 | 9.3 | ND |
| Material Balance Error (%) | 0.50 | 0.79 | 0.83 | ND |
| PAC Input (g/min.) | 0.59 | 0.67 | 0.52 | 1.24 |
| PAC Output (g/min.) | 0.53 | 0.64 | 0.48 | 0.70 |
| PAC Material Balance Error (%) | 10.93 | 3.15 | 6.47 | ND |
| PAC Yield (%) Recovered in Liquid Extract | 25.08 | 33.65 | 65.70 | 56.18 |

ND: not determined
PAC: proanthocyanidins

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for extracting xyloglucans from fruit, comprising:
    treating the fruit in a first extraction in a tank by bathing the fruit in a first extraction liquid, wherein the first extraction is performed at a temperature of about 75° F. or less;
    collecting the first extraction liquid to thereby provide a juice extract and a once-extracted fruit;
    treating the once-extracted fruit in a second extraction in a tank by bathing the once-extracted fruit in a second extraction liquid, wherein the once-extracted fruit is contacted with pectinase enzymes under conditions sufficient to digest at least a portion of the pectin in the once-extracted fruit, and wherein the second extraction is performed at a temperature of at least about 90° F.;
    collecting the second extraction liquid to thereby provide a xyloglucan and proanthocyanidin-containing extract and a twice-extracted fruit;
    treating the xyloglucan and proanthocyanidin-containing extract to remove at least a portion of the proanthocyanidins from the extract, to thereby provide a xyloglucan-enriched extract; and
    collecting the xyloglucan-enriched extract.

2. The method of claim 1, wherein the first extraction is performed at a temperature of less than 70° F.

3. The method of claim 1, wherein the second extraction extracts at least 10% of the soluble solids that were present in the once-extracted fruit.

4. The method of claim 1, wherein the first extraction liquid is substantially free of pectinase enzymes.

5. The method of claim 1, wherein the fruit is a cranberry.

6. The method of claim 1, wherein treating the xyloglucan and proanthocyanidin-containing extract includes filtering the extract.

7. The method of claim 1, wherein treating the xyloglucan and proanthocyanidin-containing extract includes using column chromatography to remove proanthocyanidins from the extract.

8. The method of claim 1, further comprising concentrating the xyloglucan-containing extract or xyloglucan-enriched extract to thereby form a concentrated extract.

9. The method of claim 8, wherein the concentrated extract is a powdered extract.

10. The method of claim 1, wherein the fruit is a berry.

11. The method of claim 1, wherein the fruit is selected from the group consisting of cranberry, blueberry, cherry, blackberry, and raspberry.

12. The method of claim 1, wherein the fruit is grape.

13. The method of claim 1, wherein the fruit is apple.

14. The method of claim 1, wherein the fruit is selected from the group consisting of kiwi, guava, mango, and passion.

15. A method for extracting xyloglucans from fruit, comprising:

treating the fruit in a first extraction in a tank by bathing the fruit in a first extraction liquid, wherein the first extraction is performed at a temperature of about 75° F. or less;

collecting the first extraction liquid to thereby provide a juice extract and a once-extracted fruit;

treating the once-extracted fruit in a second extraction in a tank by bathing the once-extracted fruit in a second extraction liquid, wherein the second extraction is performed at a temperature of at least about 130° F. and under conditions sufficient to solubilize a substantial portion of the pectin in the once-extracted fruit;

collecting the second extraction liquid to thereby provide a xyloglucan and proanthocyanidin-containing extract and a twice-extracted fruit;

treating the xyloglucan and proanthocyanidin-containing extract to remove at least a portion of the proanthocyanidins from the extract, to thereby provide a xyloglucan-enriched extract; and collecting the xyloglucan-enriched extract.

16. The method of claim 15, wherein the first extraction is performed at a temperature of less than 70° F.

17. The method of claim 15, wherein the second extraction extracts at least 10% of the soluble solids that were present in the once-extracted fruit.

18. The method of claim 15, wherein the first extraction liquid is substantially free of pectinase enzymes.

19. The method of claim 15, wherein the fruit is a cranberry.

20. The method of claim 15, wherein treating the xyloglucan and proanthocyanidin-containing extract includes filtering the extract.

21. The method of claim 15, wherein treating the xyloglucan and proanthocyanidin-containing extract includes using column chromatography to remove proanthocyanidins from the extract.

22. The method of claim 15, further comprising concentrating the xyloglucan-containing extract or xyloglucan-enriched extract to thereby form a concentrated extract.

23. The method of claim 22, wherein the concentrated extract is a powdered extract.

24. The method of claim 15, wherein the fruit is a berry.

25. The method of claim 15, wherein the fruit is selected from the group consisting of cranberry, blueberry, cherry, blackberry, and raspberry.

26. The method of claim 15, wherein the fruit is grape.

27. The method of claim 15, wherein the fruit is apple.

28. The method of claim 15, wherein the fruit is selected from the group consisting of kiwi, guava, mango, and passion.

29. A method for extracting xyloglucans from fruit, comprising:

treating the fruit in a first extraction in a tank by bathing the fruit in a first extraction liquid, wherein the first extraction is performed at a temperature of about 75° F. or less;

collecting the first extraction liquid to thereby provide a juice extract and a once-extracted fruit;

treating the once-extracted fruit in a second extraction in a tank by bathing the once-extracted fruit in a second extraction liquid, wherein the second extraction is performed at a temperature of at least about 90° F. to about 129° F.;

collecting the second extraction liquid to thereby provide a proanthocyanidin-containing extract and a twice-extracted fruit;

treating the twice-extracted fruit in a xyloglucan extraction in a tank by bathing the twice-extracted fruit in a third extraction liquid, wherein the twice-extracted fruit is contacted with pectinase enzymes under conditions sufficient to digest at least a portion of the pectin in the twice-extracted fruit, to thereby provide a xyloglucan-containing extract and a thrice-extracted fruit; and collecting the xyloglucan-containing extract.

30. The method of claim 29, further comprising treating the xyloglucan-containing extract to remove proanthocyanidins.

31. The method of claim 30, wherein the proanthocyanidins are removed using column chromatography.

32. The method of claim 29, wherein the first extraction is performed at a temperature of less than 70° F.

33. The method of claim 29, wherein the second extraction extracts at least 10% of the soluble solids that were present in the once-extracted fruit.

34. The method of claim 29, wherein the first extraction liquid is substantially free of pectinase enzymes.

35. The method of claim 29, wherein the fruit is a cranberry.

36. The method of claim 29, wherein treating the xyloglucan and proanthocyanidin-containing extract includes filtering the extract.

37. The method of claim 29, wherein treating the xyloglucan and proanthocyanidin-containing extract includes using column chromatography to remove proanthocyanidins from the extract.

38. The method of claim 29, further comprising concentrating the xyloglucan-containing extract or xyloglucan-enriched extract to thereby form a concentrated extract.

39. The method of claim 38, wherein the concentrated extract is a powdered extract.

40. The method of claim 29, wherein the fruit is a berry.

41. The method of claim 29, wherein the fruit is selected from the group consisting of cranberry, blueberry, cherry, blackberry, and raspberry.

42. The method of claim 29, wherein the fruit is grape.

43. The method of claim 29, wherein the fruit is apple.

44. The method of claim 29, wherein the fruit is selected from the group consisting of kiwi, guava, mango, and passion.

45. A method for extracting xyloglucans from fruit, comprising:

treating the fruit in a first extraction in a tank by bathing the fruit in a first extraction liquid, wherein the first extraction is performed at a temperature of about 75° F. or less;

collecting the first extraction liquid to thereby provide a juice extract and a once-extracted fruit;

treating the once-extracted fruit in a second extraction in a tank by bathing the once-extracted fruit in a second extraction liquid, wherein the second extraction is performed at a temperature of at least about 90° F. to about 129° F.;

collecting the second extraction liquid to thereby provide a proanthocyanidin-containing extract and a twice-extracted fruit;

treating the twice-extracted fruit in a tank by bathing the twice-extracted fruit in a third extraction liquid, wherein the third extraction is performed at a temperature of at least about 130° F. and under conditions sufficient to solubilize a substantial portion of the pectin in the twice-extracted fruit, to thereby provide a xyloglucan-containing extract and a thrice-extracted fruit; and collecting the xyloglucan-containing extract.

46. The method of claim 45, further comprising treating the xyloglucan-containing extract to remove proanthocyanidins.

47. The method of claim 46, wherein the proanthocyanidins are removed using column chromatography.

48. The method of claim 45, wherein the first extraction is performed at a temperature of less than 70° F.

49. The method of claim 45, wherein the second extraction extracts at least 10% of the soluble solids that were present in the once-extracted fruit.

50. The method of claim 45, wherein the first extraction liquid is substantially free of pectinase enzymes.

51. The method of claim 45, wherein the fruit is a cranberry.

52. The method of claim 45, wherein treating the xyloglucan and proanthocyanidin-containing extract includes filtering the extract.

53. The method of claim 45, wherein treating the xyloglucan and proanthocyanidin-containing extract includes using column chromatography to remove proanthocyanidins from the extract.

54. The method of claim 45, further comprising concentrating the xyloglucan-containing extract or xyloglucan-enriched extract to thereby form a concentrated extract.

55. The method of claim 54, wherein the concentrated extract is a powdered extract.

56. The method of claim 45, wherein the fruit is a berry.

57. The method of claim 45, wherein the fruit is selected from the group consisting of cranberry, blueberry, cherry, blackberry, and raspberry.

58. The method of claim 45, wherein the fruit is grape.

59. The method of claim 45, wherein the fruit is apple.

60. The method of claim 45, wherein the fruit is selected from the group consisting of kiwi, guava, mango, and passion.

* * * * *